United States Patent [19]
Kim

[11] Patent Number: 5,820,112
[45] Date of Patent: Oct. 13, 1998

[54] LEVELING VALVE APPARATUS FOR CONTROLLING VEHICLE CAB LEVELING

[75] Inventor: Gitae Kim, Ulsan, Rep. of Korea

[73] Assignee: Hyundai Motor Company, Seoul, Rep. of Korea

[21] Appl. No.: 689,080

[22] Filed: Jul. 30, 1996

[30]     Foreign Application Priority Data

Jul. 31, 1995 [KR]   Rep. of Korea ................. 1995-23202

[51] Int. Cl.⁶ ................................ F16F 5/00; F16F 9/00
[52] U.S. Cl. ................................. 267/64.13; 264/DIG. 1; 188/195
[58] Field of Search ..................... 267/DIG. 1, DIG. 2, 267/64.16, 64.28; 188/283, 195

[56]            References Cited

U.S. PATENT DOCUMENTS

| 2,959,426 | 11/1960 | Augustin | 267/DIG. 1 |
| 3,208,760 | 9/1965 | Lucien et al. | 267/DIG. 1 |
| 5,050,849 | 9/1991 | Takagi | 188/283 |
| 5,077,656 | 12/1991 | Waldron et al. | |

FOREIGN PATENT DOCUMENTS

| 5-35420 | 4/1980 | Japan . |
| 55-55077 | 4/1980 | Japan . |
| 63-24342 | 2/1988 | Japan . |

*Primary Examiner*—Matthew C. Graham
*Attorney, Agent, or Firm*—Finnegan, Henderson, Farabow, Garrett & Dunner, L.L.P.

[57]                ABSTRACT

A vehicle cab levelling apparatus includes a spool formed extendedly from the piston so as to shut the exhaustion valve by closely attaching thereto and to open the exhaustion valve by distancing therefrom in accordance with the upward and downward movement of the piston, a slider valve provided on the periphery of the spool so as to move upwardly and downwardly along the axis of the spool, shutting or opening the discharge passage, and a valve operation member for operating in accordance with the upward and downward movement of the lever, and shutting the discharge passages by shifting the slider valve in accordance with supplying an externally provided air into an operation chamber formed by the slider valve. The valve apparatus enables reducing power loss by preventing an undesired exhaustion of the compressed air at a vehicle travelling stage wherein the upward and downward movement occurs fastly and constantly, by providing a slider valve for blocking discharge passages and a slider valve member for forming an air pressure so as to operate the slider valve, thereby reducing the loss of the compressed air serving as a braking source and thus maintaining a sufficient brake pressure, whereby a strong brake force can be obtained, and the passengers as well as the driver can enjoy a quieter and more comfortable driving.

8 Claims, 2 Drawing Sheets

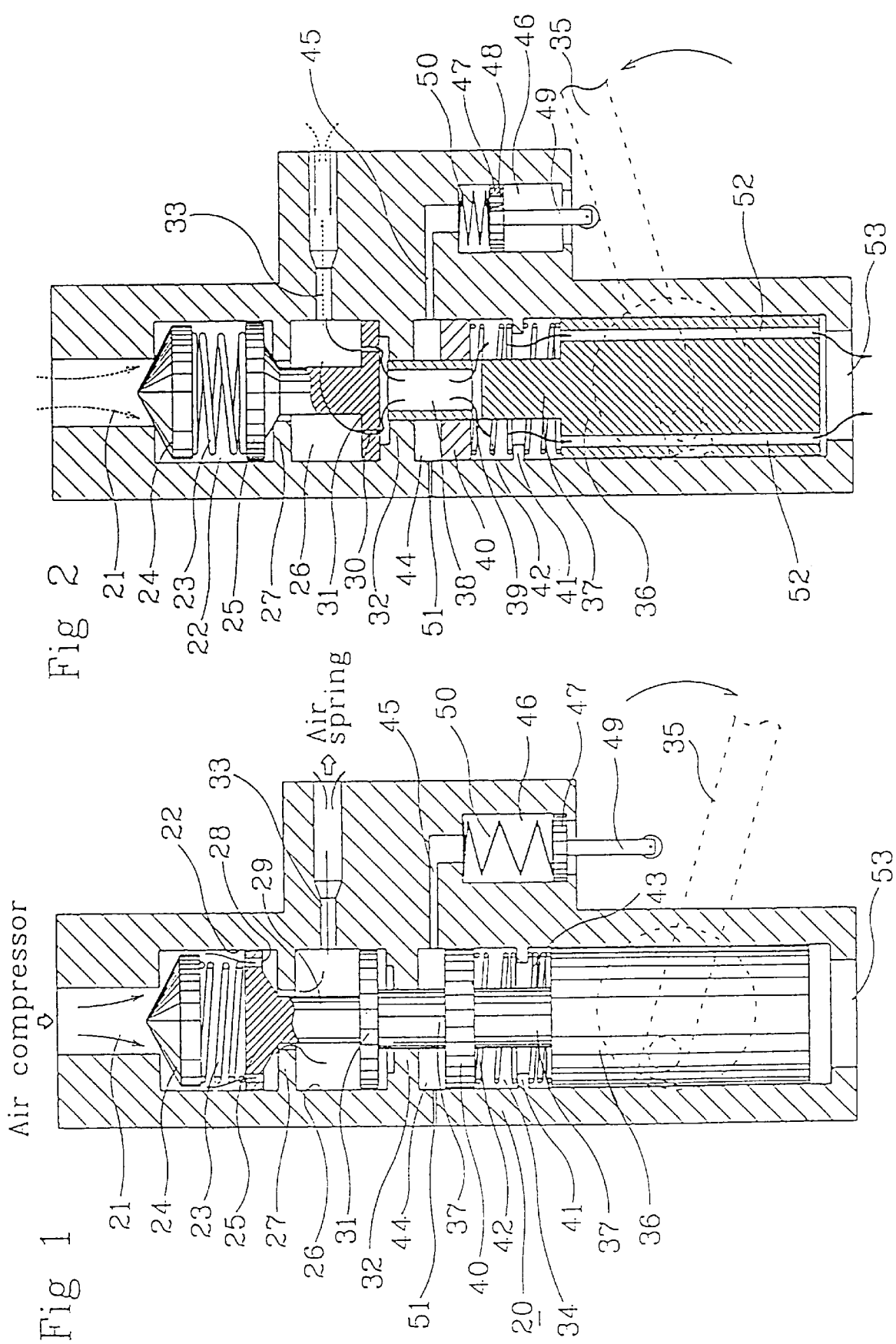

LEVELING VALVE APPARATUS FOR CONTROLLING VEHICLE CAB LEVELING

FIELD OF THE INVENTION

The present invention relates to a vehicle cab valve, and more particularly to a vehicle cab leveling valve apparatus capable of adjusting the posture of the cab so as to maintain a constant level during the vehicle movement.

DESCRIPTION OF THE PRIOR ART

A leveling valve has been generally adopted for use in large vehicles such as a bus or a truck for maintaining the vehicle at a desired level by automatically controlling the air pressure therein in accordance with the fluctuation of a cab load weight, wherein the compressed air for enabling a brake operation of the vehicle is employed to produce the preferred air pressure.

FIG. 4 shows a conventional air suspension leveling valve apparatus which is installed on a lower surface portion of a vehicle cab.

The conventional leveling valve apparatus provides air flow therein by the up-and-down movement of a lever 1 generated by shaking a vehicle cab, the operation of which apparatus is described below.

When the lever 1 becomes horizontal, a suction valve 2 and a discharge valve 3 remain closed, and accordingly a second chamber 5 is blocked off. Thus, the compressed air flow for functioning against an air spring is not generated. At the above stage of the conventional leveling valve body, when a heavy weight becomes loaded into the vehicle cab, the lever 1 connected to the lower surface of the cab moves downward, and a fixed shaft provided in one side portion of the valve body begins rotating. Since a pin type projection is formed on an eccentric center of the fixed shaft, the rotation of the fixed shaft enables the pin type projection to move upwards and conjoin a recess of a piston 6. Then, the piston 6, connected to the eccentric center of the fixed shaft and a spool 7, concurrently move upward, thereby opening the suction valve 2. At this time, the discharge valve 3 which is stuck to the spool 7 remains closed. As a result, the compressed air flows into the air spring device via both the first chamber 4 and the second chamber 5. That is, the ascending of the spool 7 in accordance with the upward movement of the piston 6 causes the suction valve 2 to be opened, and thus to push open the reverse valve 15, whereby the compressed air flowing externally into the first chamber 4 continues to flow down into the second chamber 5. The discharge valve 3 having a certain distance obtained from a valve seat engages an upper portion of the spool 7, thereby blocking the central discharge passage 11 formed as a hole along the axis of the spool 7.

Consequently, the compressed air flowing into the second chamber 5 is supplied after passing through an outlet 11 into the air spring device which supports the vehicle cab.

When the compressed air has flowed via the outlet 11 into the air spring, the lowered vehicle cab will move upward, and then the lever 1 will recover the horizontal level position, thus closing each of the suction valve and the discharge valve 3, thus blocking off the second chamber 5 and accordingly the level state of the vehicle cab can be obtained.

Meanwhile, when the lever moves upward due to a light weight loaded in the vehicle cab or a removal of weight from the cab, an upper portion of the spool 7 will have a certain distance from the inner surface of the discharge valve 3, thereby opening the discharge valve 3 therethrough and having the suction valve 2 closed in accordance with the downward movements of the piston 6 and the spool 7. Consequently, the second chamber 5 is opened through each of the discharge valve 10 and the outlet 12 to the outer atmosphere.

The highly compressed air for functioning against the air spring is discharged into the outer atmosphere through the second chamber 5, the discharge passage 10 and the outlet 12 provided at a lower end portion of the piston 6. When the air in the air spring portion is externally discharged, the vehicle cab will move downward to a desired level. Also, when the lever 1 reaches the horizontal level position according to the downward movement of the cab, the second chamber 5 will be shut off from the exterior in accordance with the blocking of the discharge passage 10 by having the upper portion of the spool 7 engage the discharge valve 3. Therefore, the vehicle cab remains level by maintaining a regular air pressure.

However, the above-described conventional leveling valve apparatus has a couple of disadvantages, in which the numerous repeated influx and discharge of the compressed air in accordance with the upward and downward movement of a vehicle cab during the vehicle traveling generates a significant amount of the compressed air exhaustion, thereby leading directly to power loss due to the excessive operation of an air compressor. More critically, because the compressed air is necessary to provide function for a brake system as well as an air suspension device in a vehicle, such excessive exhaustion of the compressed air can reduce the air pressure which is available to the air brake system, thus threatening driving safety by weakening the braking power of a vehicle.

An additional disadvantage of the conventional valve apparatus is the heavy noise being produced when the compressed air continues to be discharged from the above-described leveling valve apparatus which may tensely tease the driver's nerve.

SUMMARY OF THE INVENTION

Accordingly, it is an object of the present invention to provide a vehicle cab leveling apparatus capable of reducing power loss by preventing excessive exhaustion of compressed air which is supplied to maintain a desired regular level of a vehicle cab during the upward and downward movements occurring in a vehicle having a cab thereon such as a truck.

It is another object of the present invention to provide a vehicle cab leveling valve apparatus for minimizing the noise resulting from the compressed air exhaustion by reducing the frequency of the air exhaustion which is performed to maintain a horizontal level of a vehicle cab.

To achieve the above-described object, there is provided a vehicle cab leveling valve apparatus wherein a suction and an exhaustion of compressed air are blocked at a horizontal level of a vehicle cab; when lowered from the horizontal level, the vehicle cab is raised to the horizontal level by the compressed air flowing into an air spring through a suction valve which is opened in accordance with an upward moving piston powered by the downward moving lever; and when raised up to a certain height above the horizontal level thereof in accordance with the upward moving vehicle cab, the lever is lowered to the horizontal level by exhausting the compressed air stored in the air spring through an exhaustion valve opened externally by the downward moving piston. The exhaustion passage opened therefrom comprises a spool formed extendedly from the piston so as to shut the exhaustion valve by engaging a valve seat thereof and to open the exhaustion valve by spacing from the valve seat in accordance with the upward and downward movement of the piston. A slider valve is provided on the periphery of the spool so as to move upwardly and downwardly along the axis of the spool, shutting or opening the discharge passage. A valve operation member for operating in accordance with the upward and downward movement of the lever, and for shutting the discharge passages by shifting the slider valve in accordance with supplying externally provided air into an operation chamber formed by the slider valve is also provided.

BRIEF DESCRIPTION OF THE DRAWINGS

The accompanying drawings in accordance with the preferred embodiments of the present invention will be described as follows.

FIG. 1 is a cross-sectional view of an embodiment of the present invention showing an operating state thereof when a lever of a vehicle cab leveling apparatus is moved downwards.

FIG. 2 is a cross-sectional view of the embodiment of the present invention showing an operating state thereof when a lever of a vehicle cab leveling apparatus is moved upwards.

DETAILED DESCRIPTION OF THE PRESENT INVENTION

Figure 4:
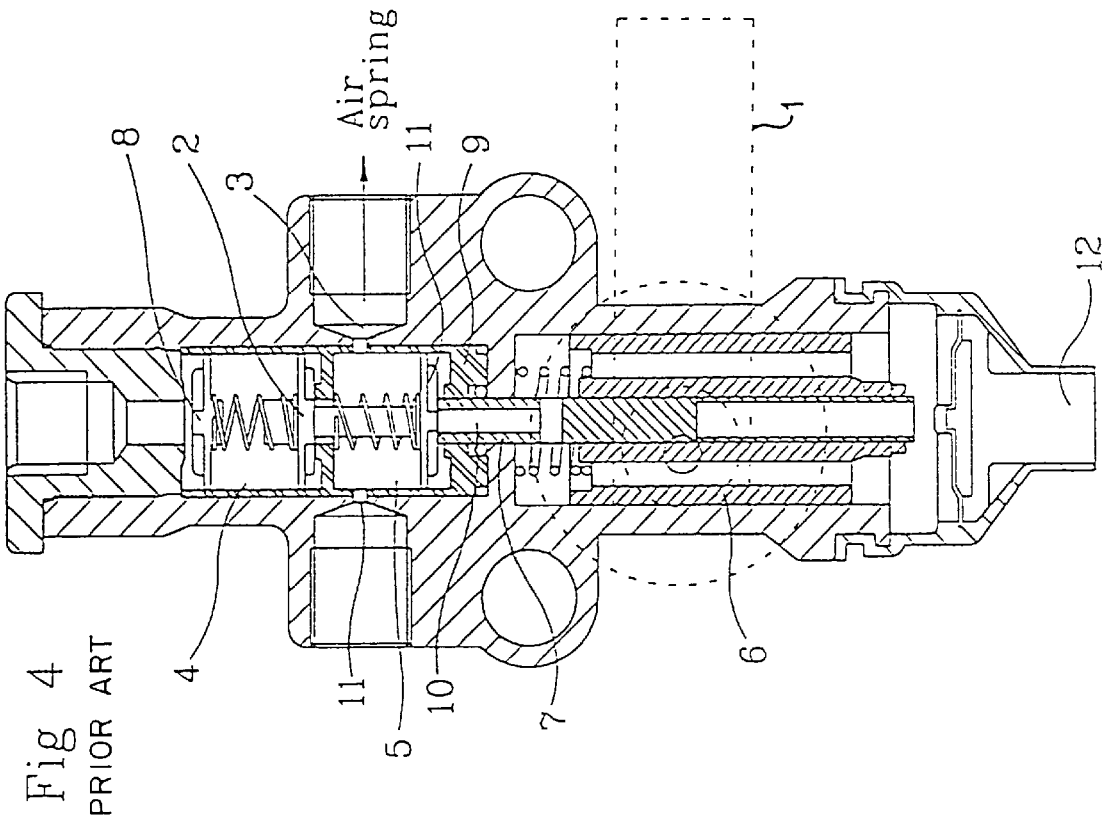
FIG. 4 is a cross-sectional view showing a conventional vehicle cab leveling apparatus.
Figure 3:
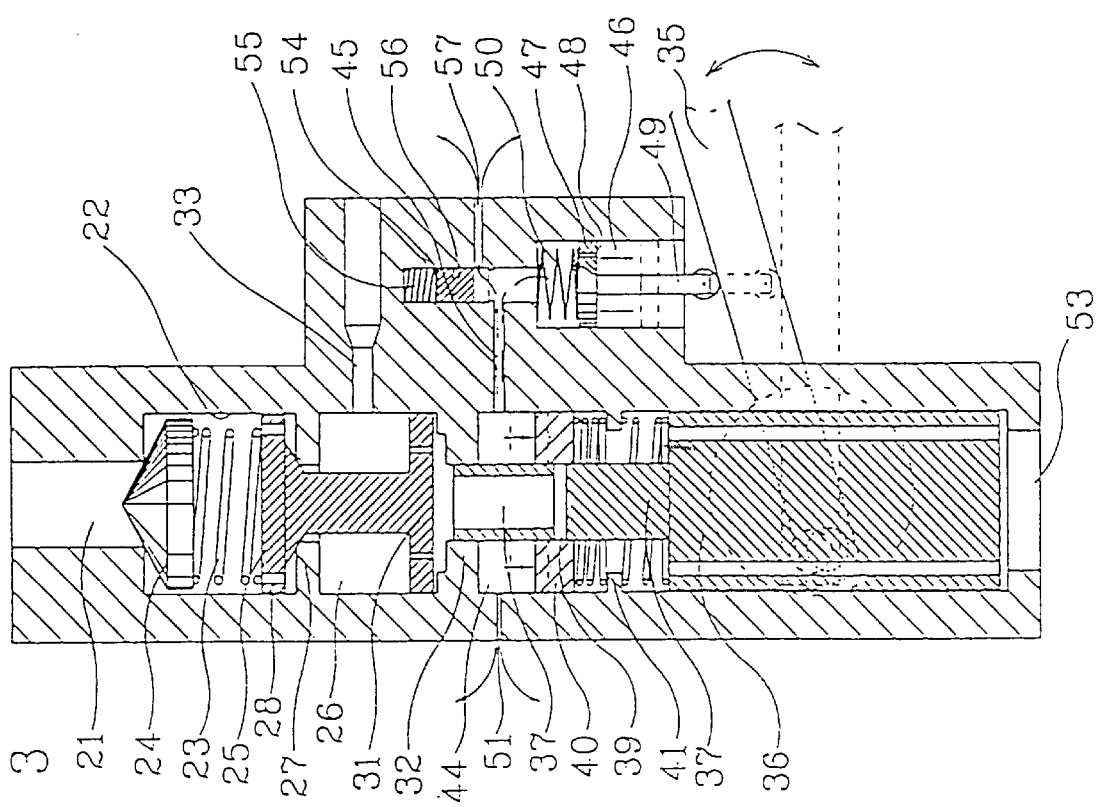
FIG. 3 is a cross-sectional view of another embodiment of the present invention showing an operating state thereof when the lever performs the speedy movement upwardly and downwardly.

With reference to FIGS. 1 through 3, the structure of a vehicle cab leveling apparatus in accordance with the present invention will be set forth below.

A suction orifice 21 for sucking inward the compressed air from an air compressor is formed in the upper end portion of a valve body 20. A reverse valve 24 elastically supported by a compression spring 23 for preventing the reverse flow of the incoming compressed air is provided in a first chamber 22 which is formed extendedly from the suction orifice 21.

The compression spring 23 is supported by a suction valve 25. A plurality of first passages 28 are formed through the suction valve 25 for separating the first chamber 22 from a second chamber 26 or for connecting the first and second chambers 22, 26 through the first passages 28 by having the suction valve 25 closely adhered to or distanced from a valve seat 27, respectively.

A discharge valve 31 having a plurality of second passages 30 therein is provided at the end portion of a valve step 29 extended from the suction valve 25. The discharge valve 31 is placed onto or distanced from a valve seat 32 provided beneath the lower portion of the second chamber 26.

A flow hole 33 connecting the second chamber 26 and an air spring (not shown) therethrough is formed in a side wall of the second chamber 26.

A piston 36 is provided in a third chamber 34 separated by the valve seat 32 from the second chamber 26 so as to enable a sliding movement up and down the axis of the third chamber 34. The piston 36 is interlocked by a lever 35, which gradient shifts in accordance with the load amount of a vehicle cab. A spool 37 extending upwardly from the piston 36 and having a smaller diameter than that of the piston 36 penetrates the valve seat 32, contacting the lower surface of the discharge valve 31.

Inside the spool 37, a discharge passage 38 is formed along the upper half portion of the axis of the spool 37. A plurality of discharge passages 39 are formed perpendicularly to the discharge passage 38 which is opened through the passages 39 to the third chamber 34.

A slider valve 40 is provided on the periphery of the spool 37 so as to open or shut the discharge passages 39 by the upward and downward movement of the slider valve. The slider valve 40 is elastically supported by a return spring 42 provided between the slider valve 40 and an inward projection 41 formed extendedly from the lower and inner peripheral surface of the third chamber 34.

The piston 36 is also elastically supported by a return spring 43 provided between the inward projection 41 and the piston 36.

An air duct 45 is formed in a side wall of a valve operation chamber 44 provided beneath the lower surface of the valve seat 32. The air duct 45 is open to a pressure cylinder 46 serving as an air compressor for operating the slider valve 40, and the air within the pressure cylinder 46 is transferred into the valve operation chamber 44 under pressure in accordance with the pressure movement of the piston 47.

A suction duct 48 is punchingly formed in the piston 47 so as to suck the external air into the cylinder 46 by an upward stroke of the piston 47. When an externally projected rod 49 is pushed up by the upward movement of the lever 35, the piston 47 performs an air compressing operation in the cylinder 46, and then during a downward movement of the lever 35, the piston 47 returns to the initial level thereof in accordance with the elasticity of the return spring 50.

An exhaust duct 51 having a diameter smaller than that of the air duct 45 is formed in another side wall of the operation chamber 44. The discharge passages 38 and 39 are opened to an exhaust exit 53 exposed toward the outer atmosphere by passing through a plurality of holes 52 which are punchingly formed along the axis of the piston 36.

The operation of the preferred embodiments in accordance with the present invention will now be described.

When a vehicle cab maintains a optimum posture at a stationary stage, the lever 35 remains level, and each of the suction valve 25 and the discharge valve 31 is closely adhered to the valve seats 27 and 32, respectively. The upper portion of the spool 37 is also adhered to the discharge valve 31. Thus, each of the upper and lower valves 25 and 31 becomes closed. As a result, since the second chamber 26 is separated from the first chamber 22 and the third chamber 34, suction and discharge circulation of the compressed air does not occur.

When the cab load becomes heavier, as shown in FIG. 1, the lever 35 tiltingly moves downward, thus raising the piston 36 which concurrently moves upward pressing the return spring 43. The rising piston 36 causes the upper portion of the spool 37 to push up the discharge valve 31, thereby distancing each of the suction valve 25 and the discharge valve 31 from the respectively corresponding valve seats 27 and 32. Due to the thusly opened suction valve 25, the compressed air flowing into the air flow orifice 21 pushes open the reverse valve 24, flows down into the first chamber 22 and is guided into the second chamber 26 via the passages 28 and the opening provided between the valve stem 29 and the valve seat 27. At this time, because the upper portion of the spool 37 is adhered to the lower surface of the discharge valve 31 and the discharge passage 38 is externally blocked, the compressed air flowing into the second chamber 26 is supplied through the flow duct 33 into the air spring, thereby raising the vehicle cab.

When the cab moves upward in accordance with the compressed air, each of the piston 36, the spool 37 and the suction and discharge valves 25 and 31 moves downward, and when the lever reaches the horizontal level, the suction and discharge valves 25 and 31 are shut down, and accordingly the flow of the compressed air in the valve body 20 is stopped. As a result, the vehicle cab maintains the optimum posture thereof.

Meanwhile, when the vehicle cab becomes lighter by the unloading of passengers or freights therefrom, as shown in FIG. 2, the lever 35 titlingly moves upward, thus causing the piston 36 and the spool 37 to perform the downward movement. When each of the suction and discharge valves 25 and 31 is adhered to the corresponding valve seats 27 and 32 respectively, the upper portion of the spool 37 becomes distanced from the discharge valve 31, so that the second chamber 26 and the third chamber 34 become opened to each other through the opened discharge passages 38 and 39.

Therefore, the highly compressed air for functioning against the air spring is externally exhausted via the discharge passages 38, 39 and the holes 52 formed in the piston 36, whereby the vehicle cab moves downward in accordance with the lowered air pressure in the air spring. When the lever 35 tiltingly moves back downward to the horizontal level, the upper portion of the spool 37 is adhered to the discharge valve 31 and the discharge passage 38 becomes blocked externally along with the already blocked suction valve 25 whereby the exhaustion of the compressed air is stopped and the vehicle cab maintains the horizontal level.

The above-described operation is performed at a stationary stage in which the lever 35 begins moving upwardly or downwardly from the horizontal level such as the case occurring when passengers mount into or dismount out of the vehicle cab. Meanwhile, when the vehicle cab continues repeated upward and downward shakings during the vehicle traveling, the pressure cylinder 46 operating for the slider valve 40 functions, thereby controlling the exhaustion of the compressed air.

When a vehicle cab begins speedy up-and-down movements, the piston 47 in the pressure cylinder 46 reciprocates at a speedy rate in accordance with the elasticity of the return spring 50.

At a initial stage in which the stroke movement of the piston 47 controls the compression and expansion of the air, the previously described operation generates the repeated supply and discharge of the compressed air, and yet causes lasting pressure increase in the operation chamber 44 since the externally applied air flows into the pressure cylinder 46 and is again dispatched instantly into the operation chamber 44 after being compressed by the piston 47, whereby the slider valve 40 presses the return spring 42, moves downwardly and shuts the discharge passages 39 formed punchingly in the spool 37.

The blocking of the discharge passages 39 causes the second chamber 26 to be closed, and more external discharge of the compressed air can be prevented.

When the air pressure in the operation chamber 44 is increased due to the repeated upward and downward movements of the vehicle cab, the slider valve 40 enables the discharge passages 39 to be opened due to the deeper drop of the slider valve 40, whereby the surplus pressure therein is exhausted externally through the exhaust duct 51.

However, the diameter of the exhaust duct 51 is smaller than that of the flow duct 45, so that the inner air pressure in the operation chamber 44 can increase lastingly To prevent such lasting inner pressure increase, the exhaust duct 51 can be formed larger in size so as to maintain a regular pressure using a check valve which can be provided thereto.

Instead, as shown in FIG. 3, a pressure maintenance room 54 differing from the exhaust duct 51 can be provided in a portion extending upwards from the pressure cylinder 46. In accordance with a safety valve 56 elastically supported by a spring 50, when the air pressure in the pressure cylinder 46 becomes heightened, the safety valve 56 presses the spring 55 and recedes upwards, thus causing the air to be discharged through a drain duct 57. As a result, an appropriate inner pressure for the slider valve 40 can be obtained to an extent enough to maintain a stage in which the slider valve 40 blocks the discharge passages 39.

When the slider valve 40 shuts the discharge passages 39, the heavy shaking of the vehicle cab can be prevented, and accordingly the cab slowly shifts to a horizontal level. That is, when the vehicle cab is placed at a lower level, the compressed air flows through the opened suction valve 25, so that the cab slowly moves upwards. When the cab is positioned at a higher level, since the air in the operation chamber 44 is discharged therefrom as time goes by, the slider valve 40 begins moving slowly in accordance with the elasticity of the spring 42. Therefore, the compressed air is discharged therefrom through the discharge passages 39 which are being opened slowly, whereby the vehicle cab is restored to a normal level.

Such prevention of the compressed air exhaustion as described previously is obtained when the vehicle cab generates heavy movements upward and downward in accordance with the vehicle momentum. When the gradient shift of the lever slowly occurs in a certain direction due to the weight variation of the loaded cab, the air amount pumped out of the pressure cylinder 46 remains small and the air supply rate shows a low value. Besides, the continuous air exhaustion through the suction duct 48 and the exhaustion duct 51 can interrupt the formation of an appropriate air pressure in the operation chamber 44, which pressure serves to rebound the elasticity of the spring 42. As a result, the shift of the slider valve 40 to a level for blocking the discharge passages 39 has yet to be achieved, whereby the blocking of the compressed air exhaustion cannot be obtained.

As described above, the vehicle cab leveling apparatus in accordance with the present invention enables reducing power loss by preventing an undesired exhaustion of the compressed air at a vehicle traveling stage wherein the upward and downward movement occurs quickly and constantly, by means of providing a slider valve for blocking discharge passages and a slider valve member for forming an air pressure so as to operate the slider valve, thereby reducing the loss of the compressed air serving as a braking source and thus maintaining a sufficient brake pressure, whereby a strong brake force can be obtained, and the passengers as well as the driver can enjoy a quieter and more comfortable ride.

What is claimed is:

1. A leveling valve apparatus for leveling a vehicle cab, comprising:

a spool extending from a piston associated with the vehicle cab, the spool controlling a discharge valve in response to upward and downward movement of said piston;

a slider valve on a periphery of said spool to control access to discharge passages by moving up and down along an axis of said spool, the discharge passages being located in the spool interior;

valve operation means operating in accordance with upward and downward movement of a lever, movement of said lever corresponding to a level of said vehicle cab, and shutting discharge passages by shifting said slider valve to supply external air into an operation chamber, said operation chamber being formed by said slider valve;

a safety valve for externally exhausting the air from the operation chamber when the air pressure in said operation chamber exceeds a certain value; and a valve body having an exhaustion duct and a suction duct, said exhaustion duct having a smaller diameter than that of said suction duct and discharging air flowing from said valve operation means into said operation chamber.

2. The apparatus of claim 1, wherein said slider valve has a return spring to elastically support said slider valve.

3. The apparatus of claim 1, wherein said valve operation means is an air compressor working in accordance with the upward and downward movement of said piston, and a return means of said slider valve working after the upward movement of said piston is a spring.

4. A leveling valve apparatus for leveling a vehicle cab, comprising:

a valve body;

a piston disposed within said valve body and connected to a lever external to said valve body, wherein movement of the lever corresponds to changes in level of the vehicle cab;

a spool extending from said piston, said spool opening and shutting a discharge valve by spacing and engaging, respectively, the valve and a valve seat thereof in accordance with upward and downward movement of said piston;

a slider valve provided on a periphery of said spool and moving up and down along an axis of said spool to shut or open discharge passages located inside said spool;

an air compressor working in accordance with upward and downward movement of said piston, such that shifting said slider valve shuts discharge passages and provides external air to an operation chamber formed by said slider valve, where said slider valve has a spring working after upward movement of said piston to reposition said slider valve;

a safety valve exhausting air externally from the operation chamber when air pressure in the chamber exceeds a certain value; and said valve body having an exhaustion duct and a suction duct disposed therein, said exhaustion duct having a smaller diameter than said suction duct and discharging air flowing into said operation chamber.

5. The apparatus of claim 4, wherein said slider valve has a returning means for facilitating movement.

6. The apparatus of claim 5, wherein said returning means is a spring.

7. A leveling valve apparatus for controlling a vehicle cab level having a lever corresponding to the vehicle cab level, a piston responding to the movement of the lever and a spool extending from the piston to control a discharge valve in response to the upward and downward movement of the piston, the leveling valve comprising:

a slider valve provided on a periphery of said spool to control access to discharge passages by moving up and down along an axis of the spool, where the discharge passages are located in the spool interior;

an operation chamber formed by the slider valve;

valve operation means for operating in accordance with upward and downward movement of the lever and of the piston and for shutting discharge passages by shifting the slider valve thereby supplying external air into the operation chamber;

a safety valve for externally exhausting the air from the operation chamber when the air pressure in the operation chamber exceeds a certain value; and a valve body having an exhaust duct and a suction duct, said exhaust duct having a smaller diameter than that of said suction duct and discharging air flowing from said valve operation means into the operation chamber.

8. An leveling valve apparatus for controlling a vehicle cab level comprising:

a lever corresponding to the vehicle cab level;

a piston responding to the movement of the lever;

a spool extending from the piston to control a discharge valve in response to the upward and downward movement of the piston;

a slider valve provided on a periphery of said spool to control access to discharge passages by moving up and down along an axis of the spool, where the discharge passages are located in the spool interior;

an operation chamber formed by the slider valve;

valve operation means for operating in accordance with upward and downward movement of the lever and shutting discharge passages by shifting the slider valve whereby supplying external air into the operation chamber;

a safety valve for externally exhausting the air from the operation chamber when the air pressure in the operation chamber exceeds a certain value; and a valve body having an exhaustion duct and a suction duct, said exhaustion duct having a smaller diameter than that of said suction duct and discharging air flowing from said valve operation means into the operation chamber.

* * * * *